UNITED STATES PATENT OFFICE.

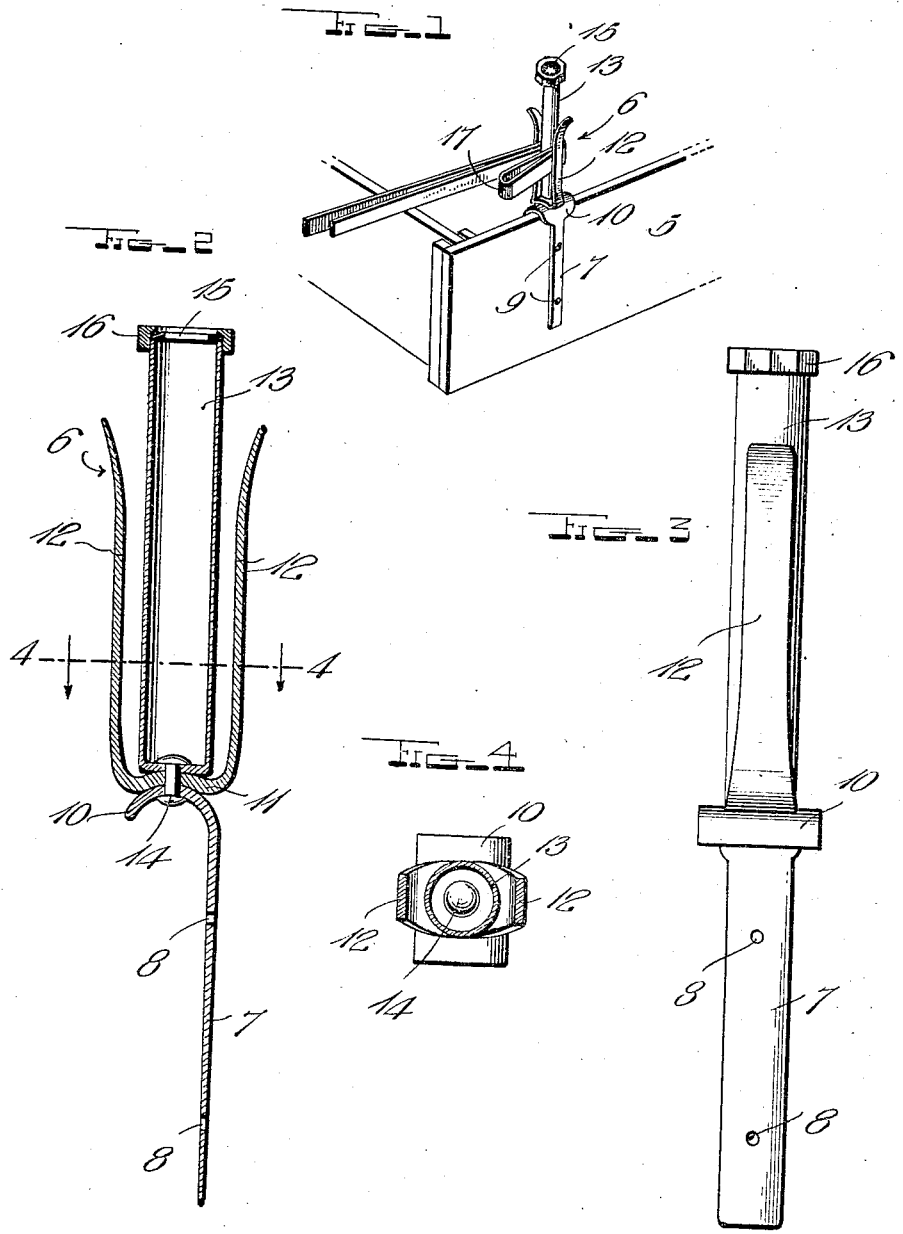

OSKAR GUSTAFSON, OF MILNOR, NORTH DAKOTA.

REIN-HOLDER.

1,283,743.

Specification of Letters Patent.

Patented Nov. 5, 1918.

Application filed December 31, 1917. Serial No. 209,704.

*To all whom it may concern:*

Be it known that I, OSKAR GUSTAFSON, a citizen of the United States, and resident of Milnor, in the county of Sargent and State of North Dakota, have invented new and useful Improvements in Rein-Holders, of which the following is a specification.

This invention relates to rein holders and has particular reference to that class of rein holders adapted to be attached to and used in connection with vehicle bodies or the like.

An important object of the invention is to provide a device of the above mentioned character which may be readily attached to or detached from a vehicle body.

A further object of the invention is to provide a device of the above mentioned character which is simple in construction, strong, durable, and cheap to manufacture.

Other objects and advantages of the invention will be apparent during the course of the following description.

In the accompanying drawings forming a part of this specification and in which like numerals are employed to designate like parts throughout the same, Figure 1 is a perspective view of a device embodying my invention and showing the same attached to the body of a vehicle, Fig. 2 is a vertical centrally longitudinal sectional view of the same, Fig. 3 is a side elevation of the same, and, Fig. 4 is a sectional view of Fig. 2 taken on the line 4—4.

In the drawings wherein for the purpose of illustration is shown a preferred form of my invention the numeral 5 indicates a vehicle body having attached thereto a rein holder, indicated as a whole by the numeral 6, which comprises an elongated shank 7 having a plurality of apertures 8 arranged therein and adapted to receive screws or the like as indicated by the numeral 9, the screws 9 being adapted to secure the device as a whole to the vehicle body 5 as shown. The upper end of the shank is provided with a cap 10 substantially arcuate in cross section as is clearly shown in Fig. 2. This cap is adapted to fit snugly upon the upper edge of the vehicle body as shown and has superposed thereon a substantially U-shaped spring member 11 provided with a pair of diverging arms 12. Upon the U-shaped member 11 and intermediate the arms thereof there is superposed a tubular sleeve 13. This sleeve is secured to the cap 10 by means of a bolt or rivet 14 passed through the closed end of the tube, the U-shaped member, and the cap 10 as clearly shown in Fig. 2. Upon the upper end of the tubular sleeve 13 there is superposed a resilient ring 15 the inner wall of which extends inwardly with respect to the inner wall of the tubular sleeve. This flexible ring is securely held in place by means of a cap 16 imposed thereupon, which cap may be secured to the tubular sleeve 13 by any suitable and desired means.

In use, should it be desired to retain the end of a rein in position the end of the same as shown at 17 is passed around the tubular sleeve 13 whereupon a portion of the same is forced downwardly between the resilient arms 12 and the tubular sleeve 13 and held therein as shown. It might be well for me to state here that the device may be used to serve not only as a rein holder but also as a means for retaining a whip or the like, the end of which may be inserted into the tubular sleeve 13 as will be readily understood from the drawings forming a part of this specification.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, what I claim as new and desire to secure and protect by Letters Patent of the United States, is:

1. A device of the character described comprising an elongated shank; a resilient U-shaped spring member imposed thereupon, said spring member comprising a pair of diverging arms; and a tubular member disposed upon said U-shaped spring member intermediate the arms thereof.

2. A device of the character described comprising an elongated shank, provided with an arcuate shaped cap; a U-shaped spring member disposed upon and secured thereto, said U-shaped spring member comprising a pair of diverging arms; and a tubular sleeve secured to said spring member intermediate the arms thereof.

OSKAR GUSTAFSON.

Copies of this patent may be obtained for five cents each, by addressing the "Commissioner of Patents, Washington, D. C."